United States Patent
Fiala et al.

(10) Patent No.: US 11,679,788 B2
(45) Date of Patent: Jun. 20, 2023

(54) TRACTION TRANSMISSION

(71) Applicant: TRAKTIONSSYSTEME AUSTRIA GMBH, Wiener Neudorf (AT)

(72) Inventors: Pavel Fiala, Wiener Neudorf (AT);
Julia Goetz, Wiener Neudorf (AT);
Michael Stockmayer, Wiener Neudorf (AT)

(73) Assignee: TRAKTIONSSYSTEME AUSTRIA GMBH, Wiener Neudorf (AT)

( * ) Notice: Subject to any disclaimer, the term of this patent is extended or adjusted under 35 U.S.C. 154(b) by 0 days.

(21) Appl. No.: 17/620,958

(22) PCT Filed: Jun. 30, 2020

(86) PCT No.: PCT/EP2020/068348
§ 371 (c)(1),
(2) Date: Dec. 20, 2021

(87) PCT Pub. No.: WO2021/058151
PCT Pub. Date: Apr. 1, 2021

(65) Prior Publication Data
US 2022/0348234 A1    Nov. 3, 2022

(30) Foreign Application Priority Data
Sep. 27, 2019   (EP) .................................... 19200031

(51) Int. Cl.
*B61C 9/38*        (2006.01)
*F16H 57/02*       (2012.01)
(Continued)

(52) U.S. Cl.
CPC ........... *B61C 9/38* (2013.01); *F16H 57/0018* (2013.01); *F16H 57/027* (2013.01);
(Continued)

(58) Field of Classification Search
CPC .. F16H 57/0018; F16H 57/025; F16H 57/027; F16H 57/029; F16H 57/0405;
(Continued)

(56) References Cited

U.S. PATENT DOCUMENTS

| 4,148,262 A | 4/1979 | Eichinger |
| 5,038,631 A * | 8/1991 | Renk ........................ F16C 33/80 |
| | | 277/412 |

(Continued)

FOREIGN PATENT DOCUMENTS

| CN | 204978655 U | 1/2016 |
| CZ | 2008552 A3 | 3/2010 |

(Continued)

OTHER PUBLICATIONS

International Search Report in PCT/EP2020/068348, dated Sep. 23, 2020.

(Continued)

*Primary Examiner* — Adam D Rogers
(74) *Attorney, Agent, or Firm* — Collard & Roe, P.C.

(57) ABSTRACT

A traction transmission for purposes of transmitting the rotation of an input drive shaft to a rail wheel which is connected in a rotationally fixed manner to an output drive shaft, has at least two transmission stages, in each case having at least one small gear or pinion, and at least one large gear, and has a transmission housing with bearings for the input drive shaft and the output drive shaft, and has transmission oil arranged in the transmission housing, wherein in the position of use the input drive shaft is arranged below the output drive shaft. The transmission housing has an attachment element for purposes of a pivotable arrangement about an axis parallel to the axis of rotation of the input drive shaft and output drive shaft.

14 Claims, 8 Drawing Sheets

(51) Int. Cl.
  *F16H 57/04*   (2010.01)
  *F16H 57/00*   (2012.01)
  *F16H 57/027*  (2012.01)
  *F16H 57/029*  (2012.01)
  *F16H 57/025*  (2012.01)

(52) U.S. Cl.
  CPC ....... *F16H 57/029* (2013.01); *F16H 57/0423* (2013.01); *F16H 57/0424* (2013.01); *F16H 57/0441* (2013.01); *F16H 57/0457* (2013.01); *F16H 57/025* (2013.01); *F16H 57/0408* (2013.01)

(58) Field of Classification Search
  CPC .............. F16H 57/0408; F16H 57/0423; F16H 57/0424; F16H 57/0457; F16H 57/0472; B61C 9/38
  See application file for complete search history.

(56) References Cited

U.S. PATENT DOCUMENTS

| | | | |
|---|---|---|---|
| 5,207,121 A * | 5/1993 | Bien | F16H 57/02 74/606 R |
| 6,464,040 B1 | 10/2002 | Hallmann et al. | |
| 9,718,479 B2 * | 8/2017 | Mishra | B61C 9/38 |
| 10,106,178 B2 | 10/2018 | Schweitzer et al. | |
| 10,428,928 B2 * | 10/2019 | Corallo | F16H 57/0495 |
| 11,320,039 B2 * | 5/2022 | Isozaki | F16H 57/0423 |
| 2004/0171452 A1 | 9/2004 | Miller et al. | |
| 2011/0000394 A1 | 1/2011 | Miki et al. | |

FOREIGN PATENT DOCUMENTS

| | | |
|---|---|---|
| DE | 42 20 754 A1 | 1/1994 |
| DE | 198 31 208 C1 | 5/1999 |
| EP | 0 548 044 A1 | 6/1993 |
| GB | 1181299 A | 2/1970 |
| JP | H08-40262 A | 2/1996 |
| JP | 2005-226841 A | 8/2005 |
| WO | 2005/017394 A1 | 2/2005 |

OTHER PUBLICATIONS

European Search Report in 19200031.3-1010, dated Mar. 17, 2020, with English translation of relevant parts.
English translation of the International Preliminary Report on Patentability in PCT/EP2020/068348, dated Mar. 31, 2022.
Chinese Office Action dated Apr. 29, 2023 in Chinese Application No. 202080046908.X, with English Translation.

* cited by examiner

TRACTION TRANSMISSION

CROSS REFERENCE TO RELATED APPLICATIONS

This application is the National Stage of PCT/EP2020/068348 filed on Jun. 30, 2020, which claims priority under 35 U.S.C. § 119 of European Application No. 19200031.3 filed on Sep. 27, 2019, the disclosure of which is incorporated by reference. The international application under PCT article 21(2) was not published in English.

BACKGROUND OF THE INVENTION

1. Field of the Invention

The invention relates to a traction transmission for purposes of transmitting the rotation of an input drive shaft to a rail wheel which is connected in a rotationally fixed manner to an output drive shaft, with at least two transmission stages, in each case having at least one small gear or pinion, and at least one large gear, and with a transmission housing with bearings for the input drive shaft and the output drive shaft, and with transmission oil arranged in the transmission housing, wherein in the position of use the input drive shaft is arranged below the output drive shaft.

The present invention relates to traction transmissions, as they are used for the connection of traction machines, that is to say, electric drive motors, preferably for rail-based vehicles, such as trams or trains.

2. Description of the Related Art

In particular in low-floor rail vehicles, which allow passengers to get on and off easily, there is very little space available for the bogie, the transmission, and the drive motors, due to the low level of the floor. In rail vehicles, individual wheels or wheel sets can in each case be driven by way of appropriate transmissions, in each case with a drive motor. Accordingly, a bogie with four wheels usually comprises two or four drive motors and two or four transmissions. Since rail vehicles are usually designed for two directions of travel, the electrical machines and the transmissions must be designed for both directions of rotation.

EP 0 548 044 B1, for example, describes a rail vehicle, the bogie of which is designed in particular for low-floor rail vehicles with a low floor height, and thus limited space for bogie, transmission and drive motors. Here the drive is preferably provided by wheel hub motors, which are accommodated directly under the wheel housings. The wheel hub motors drive the rail wheels by way of planetary transmissions.

JP H08 40262 A shows a traction transmission of this particular type, in which the input drive shaft can be arranged below the output drive shaft, which is connected in a rotationally fixed manner to the rail wheel. Other traction transmissions are also described, for example, in U.S. Pat. No. 4,148,262 A, although no details of the type of lubrication are disclosed.

Low-floor rail vehicles of known art have, due to the larger build of the drive motors, transmission and bogies, areas with a higher floor height, that is to say, areas that are not available to passengers; this of course brings with it disadvantages for passenger transport, especially in urban areas.

The transmissions should be designed to be as small as possible, but still have a long service life and long maintenance intervals, and be robust and simple in construction.

SUMMARY OF THE INVENTION

The object of the present invention consists in the creation of a traction transmission unit as cited above, which is designed to be as space-saving, simple and robust as possible, so that in particular an application as a transmission for low-floor rail vehicles is advantageous. The traction transmission should have a longest possible service life and long maintenance intervals. It should be possible to use it in the case of particularly high-speed drive motors with, at the same time, optimum lubrication. Disadvantages of the traction transmissions of known art should be avoided or at least reduced.

The object according to the invention is achieved by means of a traction transmission as cited above, in which the transmission housing has an attachment element for purposes of a pivotable arrangement about an axis parallel to the axis of rotation of the input drive shaft and output drive shaft. By such a pivotable attachment of the transmission, the change in ground clearance due to wear of the rail wheel connected to the output drive shaft can be compensated for to a certain extent by appropriate tracking of the traction transmission. The pivotable attachment of the transmission housing is effected by way of the at least one attachment element and suitable suspension elements on the bogie of the rail vehicle that is to be driven. In that the transmission is arranged in its position of use in such a way that the input drive shaft is arranged below the output drive shaft, an application in low-floor rail vehicles is particularly advantageous. The lower-lying input drive shaft of the transmission is connected to a correspondingly lower-lying drive motor, so that the floor of a rail vehicle can be arranged even lower, and thus even more space is available to allow passengers to get on and off more easily. The transmission has, for example, two transmission stages, wherein an additional intermediate gear can be installed in the first transmission stage. The transmission therefore has, for example, five gears, which perform the reduction, in particular of a very high-speed drive motor, to a suitable rotational speed of a rail wheel of a rail vehicle. For example, drive machines with a maximum speed of over 12,000 rpm are possible, wherein the transmission undertakes reductions in the range of 14.0 to 17.0 to suitable rotational speeds of the rail wheel. The transmission oil typically takes the form of a fully synthetic oil.

The input drive shaft is advantageously arranged a vertical distance of between 50 mm and 200 mm, in particular of between 120 mm and 140 mm, below the output drive shaft. Such dimensions have proved to be particularly suitable for low-floor rail vehicles.

The transmission housing is preferably formed in at least two parts, which are connected to each other, preferably screwed together, by way of appropriate connecting elements. One housing part is preferably formed as an upper housing part, and another housing part is formed as the oil pan.

In accordance with a further feature of the invention, the height of the transmission housing in the region of the input drive shaft is less than the height of the transmission housing in the region of the output drive shaft, in particular 30% to 70% less. This results in an L-shaped configuration of the transmission housing in side view, which is particularly suitable for installation in low-floor rail vehicles, since a seat for the passenger can be arranged in a particularly suitable manner above the rail wheel and the transmission housing and drive motor, wherein the passenger sits to some extent above the transmission housing and arranges his or her feet above the input drive shaft.

If a separate oil sump is arranged underneath each large gear of each transmission stage, an optimum lubrication of all transmission stages of the traction transmission can be achieved. In the case of this particular traction transmission, with its particularly low input drive shaft, it is important to design the seals, in particular of the input drive shaft in relation to the transmission housing, and the feed of the transmission oil in the transmission housing in such a way that leakage of the transmission oil is prevented as far as possible, and lubrication of the bearings is ensured.

A feeder disc for feeding the transmission oil from the oil sump of the transmission stage, preferably of the first transmission stage, can be connected in a rotationally fixed manner to, or integrated with, the large gear or an intermediate gear of a transmission stage, preferably of the first transmission stage. This results in splash lubrication, wherein the transmission oil is transported from the oil sump, or the individual oil sumps, to the higher locations by way of the feeder disc. The feeder disc is connected in a rotationally fixed manner to the large gear or an intermediate gear of the transmission stage, or is manufactured integrally with the latter, or is integrated with the latter. Accordingly, the feeder disc rotates at a relatively high speed of, for example, 6,000 rpm and throws the transmission oil upwards in the direction of the output drive shaft. The feeder disc can be designed as a milled gear ring, which is simpler in terms of manufacture and enables the transmission oil to be fed in both directions of rotation of a drive motor. The transmission oil returns to the oil sump, or each oil sump, by way of suitable return passages.

The input drive shaft can be sealed off from the transmission housing by means of a labyrinth seal. Such a preferably open, zero wear, labyrinth seal essentially prevents the transmission oil from escaping from the transmission housing.

In addition to the labyrinth seal on the input drive shaft, contacting sealing elements can be arranged. Such additional seals can be useful for ensuring the sealing of the transmission housing, on account of the particularly low position of the input drive shaft of the traction transmission in the position of use of the transmission.

The output drive shaft is also preferably sealed relative to the transmission housing by means of a labyrinth seal. By this means any escape of the transmission oil from the transmission housing is likewise essentially prevented. The labyrinth seal of the output drive shaft also takes the form, in particular, of an open, zero wear, labyrinth seal.

At least one suction line can be arranged in the region of the feeder disc, which preferably opens out in the region of the labyrinth seal on the input drive shaft. By means of such a suction line, an extraction of the transmission oil from the region of the labyrinth seal to the oil sump is achieved by the negative pressure generated by the feeder disc, and thus any escape of transmission oil from the transmission housing is prevented.

A coupling, in particular a compensating coupling, for example a curved-tooth coupling, is usually arranged on the input drive shaft. In addition to primary spring deflections, the coupling also compensates in a suitable manner for the displacements that occur as a result of compensation for the wear of a vehicle wheel.

In order to be able to fill the transmission oil into the transmission easily, at least one closable inlet for the transmission oil is arranged on the transmission housing.

For ease of changing or draining of the transmission oil, at least one closable outlet for the transmission oil is preferably arranged on the transmission housing.

To check the level of the transmission oil, at least one sight glass can be arranged on the transmission housing at a suitable location.

If at least one vent opening is arranged on the transmission housing, pressure fluctuations in the transmission housing, such as occur due to temperature fluctuations, can be compensated for, and the formation of a negative pressure or excess pressure in the transmission housing is prevented. The at least one vent opening can be covered with a suitable cap, so as to prevent dirt from entering the interior of the transmission housing.

Appropriately designed throw-off surfaces can be arranged on the transmission housing for purposes of throwing off the transmission oil in the direction of the higher input drive shaft.

Furthermore, catching pockets are preferably provided on the inner face of the transmission housing for purposes of collection and onward direction of the transmission oil. Such catching pockets are preferably made in one piece with the transmission housing and, like the transmission housing itself, are suitably shaped such that the transmission oil can be transported to the required regions inside the transmission housing.

BRIEF DESCRIPTION OF THE DRAWINGS

The present invention will be explained in more detail with reference to the accompanying drawings. Here.

DETAILED DESCRIPTION OF THE PREFERRED EMBODIMENTS

Figure 1:
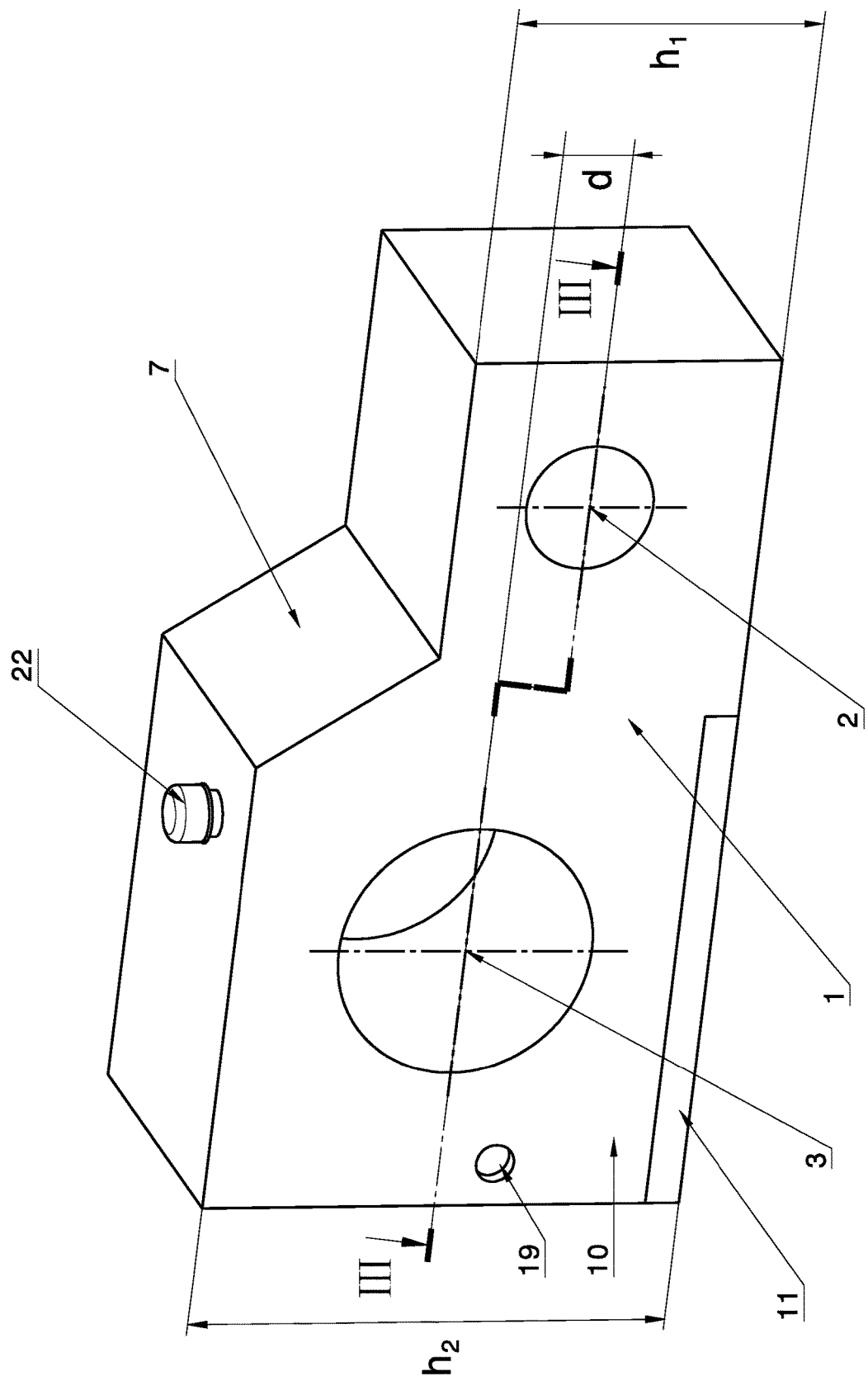
FIG. 1 shows a schematic view of a form of embodiment of a traction transmission for purposes of transmitting the rotation of an input drive shaft to an output drive shaft.

FIG. 1 shows a schematic view of a form of embodiment of a traction transmission 1 for purposes of transmitting the rotation of an input drive shaft 2 to a rail wheel of a rail vehicle, in particular a low-floor rail vehicle, which is connected in a rotationally fixed manner to an output drive shaft 3 (not shown). The traction transmission 1 has at least two transmission stages 4 (see FIG. 3). The traction transmission 1 is surrounded by a transmission housing 7, which is formed by at least two housing parts 10, 11. One housing part 10 can be formed by an upper housing part, and another housing part 11 can be formed by the oil pan. Preferably, at least one inlet 19 for the transmission oil G, and at least one vent opening 22, are arranged in the transmission housing 7, through which air can escape or be drawn in when the air inside the transmission housing 7 expands or compresses due to temperature. The at least one vent opening 22 can be covered with a suitable cap to prevent dirt from entering the interior of the transmission housing 7.

The traction transmission 1 is designed in such a way that, in the position of use of the traction transmission 1, the input drive shaft 2 is arranged below the output drive shaft 3. The lower-lying input drive shaft 2 of the traction transmission 1 is connected to a correspondingly lower-lying drive motor (not shown), as a result of which the floor of a rail vehicle can be arranged even lower in the region of the bogie and thus, in particular in the case of a step-less or barrier-free passenger compartment, a low boarding height is achieved, which allows passengers to get on and off easily. This is particularly advantageous for 100% low-floor rail vehicles.

The height $h_1$ of the transmission housing 7 in the region of the input drive shaft 2 is preferably 30% to 70% less than the height $h_2$ of the transmission housing 7 in the region of the output drive shaft 3. The vertical distance d between the input drive shaft 2 and output drive shaft 3 is preferably 50 to 200 mm, in particular 120 to 140 mm.

Figure 2:
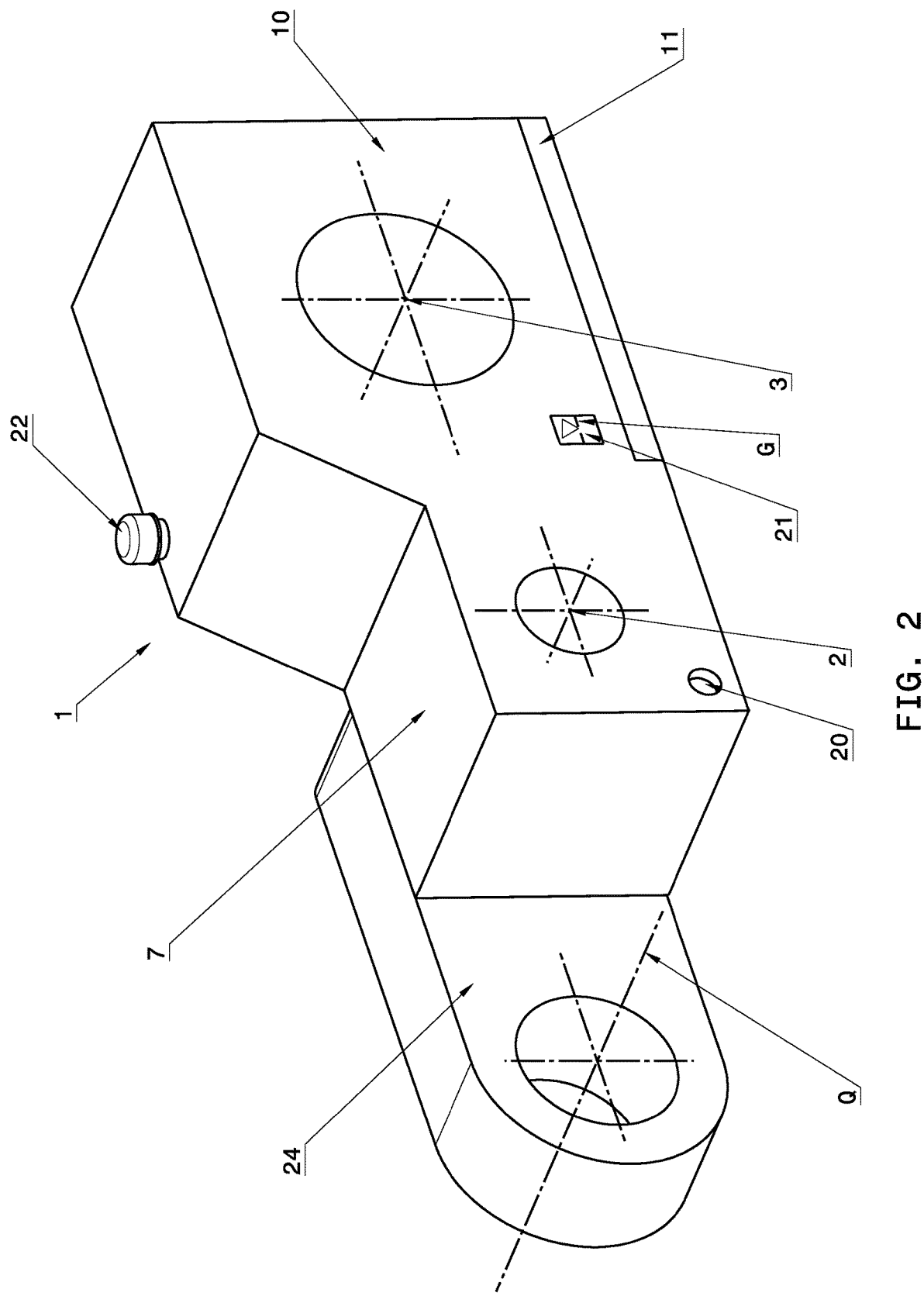
FIG. 2 shows another schematic view of a further form of embodiment of a traction transmission with an attachment element for purposes of a pivotable arrangement.

As can be seen from the form of embodiment of a traction transmission 1 according to FIG. 2, at least one outlet 20 for the transmission oil G, and at least one sight glass 21 for purposes of checking the level of the transmission oil G, are preferably also arranged at a suitable location on the transmission housing 7.

In the form of embodiment of the transmission housing 7 according to FIG. 2, an attachment element 24 is furthermore provided for the pivotable attachment of the traction transmission 1 about an axis Q parallel to the axis of rotation of the input drive shaft 2 and output drive shaft 3. By means of such a pivotable attachment of the traction transmission 1, that is to say, the transmission housing 7, the change in the ground clearance due to the wear of a rail wheel of a rail vehicle connected to the output drive shaft 3 can be compensated for to a certain extent by appropriate tracking of the traction transmission 1.

Figure 3:
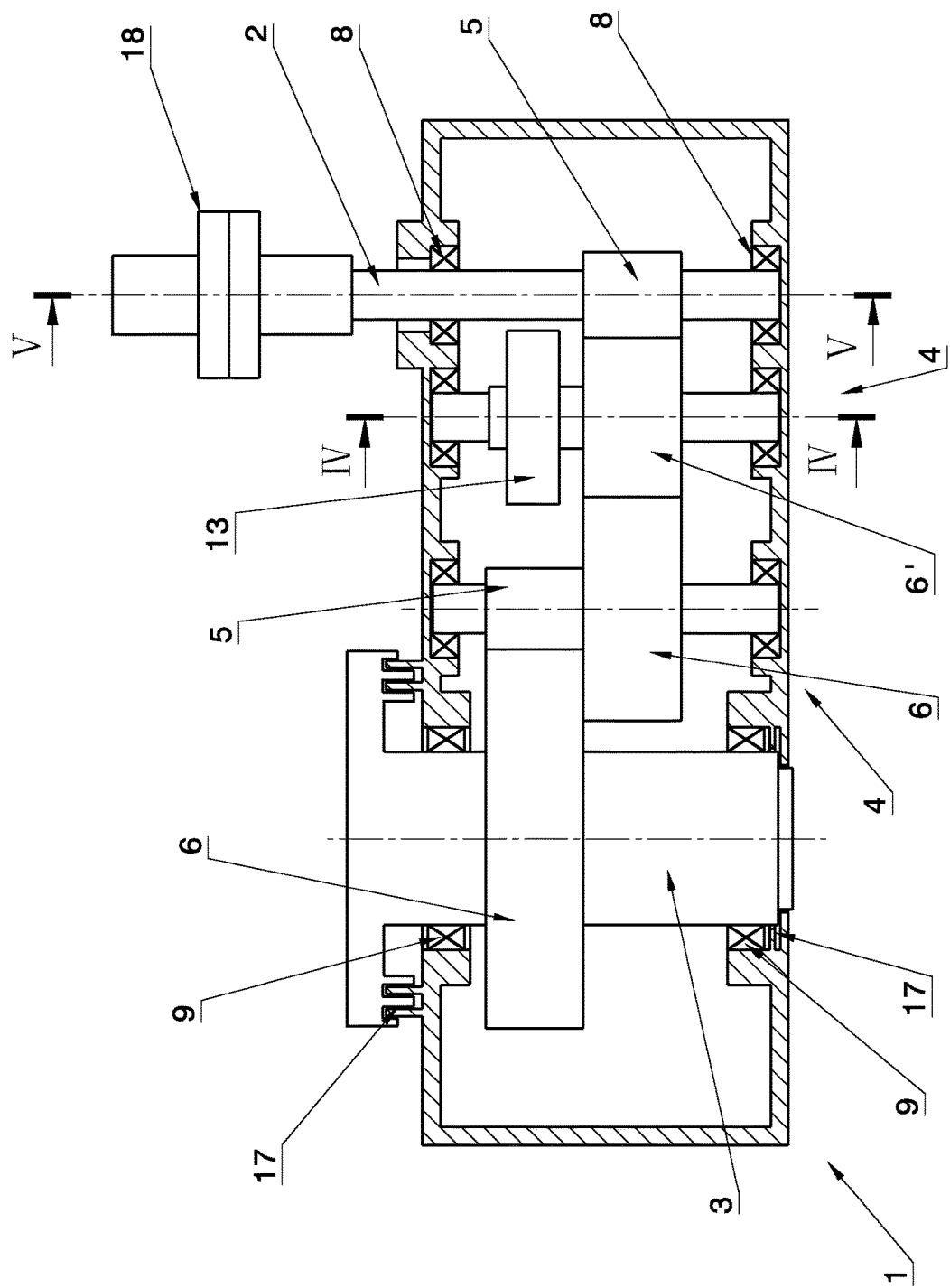
FIG. 3 shows a sectional view through a form of embodiment of a traction transmission along a line of cut III-III of FIG. 1, passing through the input drive shaft and output drive shaft.

FIG. 3 shows a section through a form of embodiment of a traction transmission 1 along the line of cut III-III from FIG. 1, which line runs through the input drive shaft 2 and the output drive shaft 3. The traction transmission 1 comprises two transmission stages 4, each with at least one small gear 5 or pinion, and at least one large gear 6, wherein an additional intermediate gear 6' is also installed in the first transmission stage 4. The traction transmission 1 therefore has, for example, five gears 5, 6, 6', which undertake the reduction, in particular of a very rapidly rotating drive motor, to a suitable rotational speed of a rail wheel of a rail vehicle. In the transmission housing 7 are arranged bearings 8 for the input drive shaft 2, bearings 9 for the output drive shaft 3, and possibly further bearings for shafts of the intermediate transmission stages 4. The input drive shaft 2 can be connected to a drive motor (not shown) by means of a coupling 18. The output drive shaft 3 is connected, for example, to a rail wheel (not shown) of a rail vehicle. The traction transmission 1 is designed in such a way that, when the input drive shaft 2 rotates, the transmission oil G also reaches the higher regions within the transmission housing 7 and lubrication of the bearings is ensured, but leakage of the transmission oil G from the transmission housing 7 is prevented as far as possible. For this purpose, the input drive shaft 2 is sealed from the transmission housing 7 by a labyrinth seal 14 (see FIG. 5), and the output drive shaft 2 is sealed from the transmission housing 7 by a labyrinth seal 17. The bearings 8, 9 can, for example, be formed by appropriate roller bearings.

Figure 4:
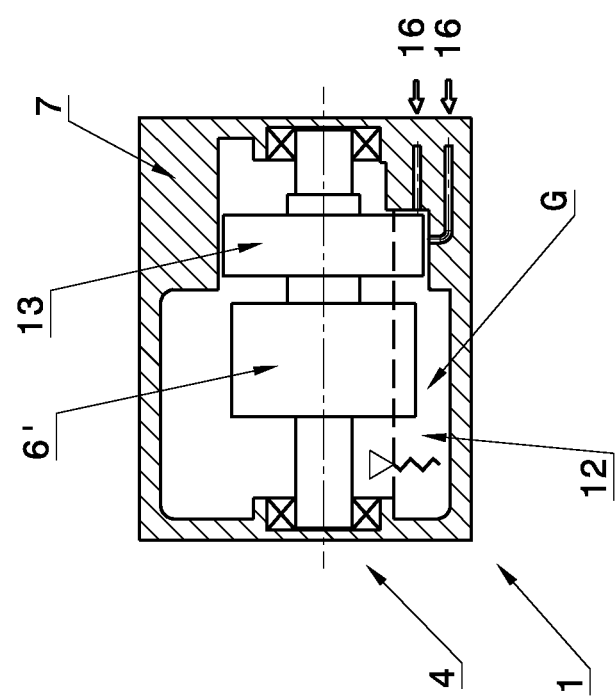
FIG. 4 shows a sectional view through the traction transmission along a line of cut IV-IV from FIG. 3.

FIG. 4 shows a vertical section through a form of embodiment of a traction transmission 1 along the line of cut IV-IV from FIG. 3. In this case, a feeder disc 13 is connected in a rotationally fixed manner to the intermediate gear 6', preferably on the first transmission stage 4, by means of which feeder disc 13 the transmission oil G is transported from the oil sump 12 to the higher locations. In the region of the feeder disc 13 at least one suction line 16 can be arranged, which preferably opens out in the region of the labyrinth seal 14 of the input drive shaft 2 (see FIG. 5). By means of the at least one suction line 16, a suction of the transmission oil G from the region of the labyrinth seal 14 of the input drive shaft 2 is achieved, and any escape of transmission oil G from the transmission housing 7 is thereby prevented.

Figure 5:
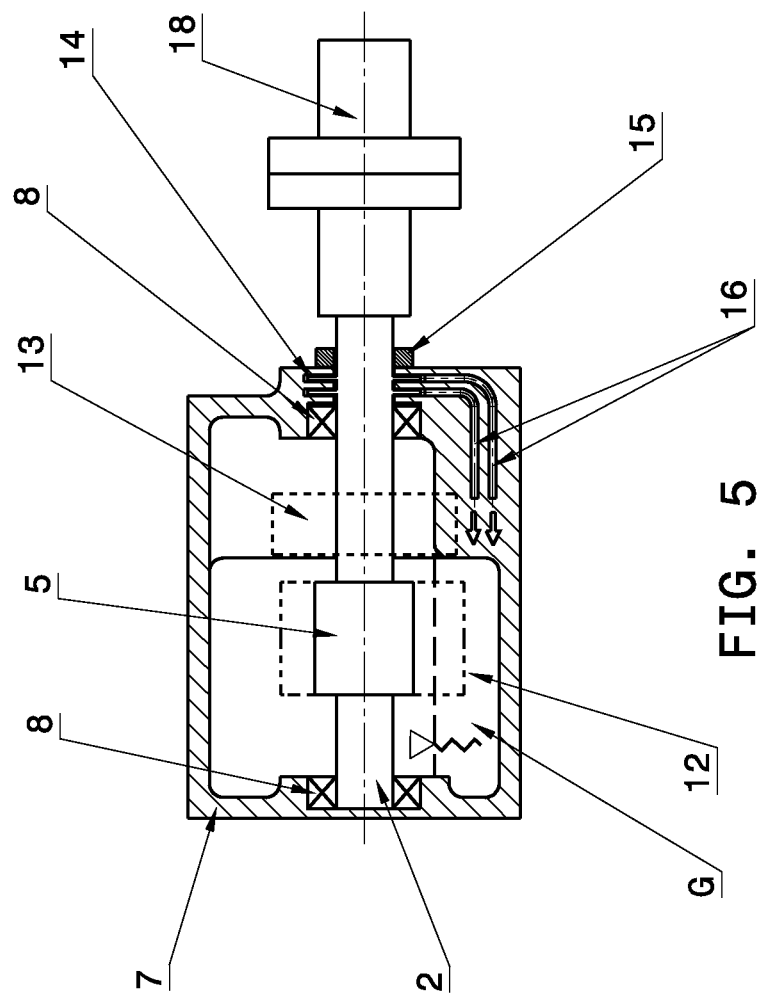
FIG. 5 shows a sectional view through the traction transmission along the input drive shaft along the line of cut V-V as in FIG. 3.

FIG. 5 shows a vertical section through the traction transmission 1 in the region of the input drive shaft 2 along the line of cut V-V from FIG. 3. Here, the labyrinth seal 14 for purposes of sealing the input drive shaft 2 with respect to the transmission housing 7 is shown. In principle, further sealing elements 15 can be arranged to prevent the escape of transmission oil G from the interior of the transmission housing 7 in the region of the input drive shaft 2.

Figure 6:
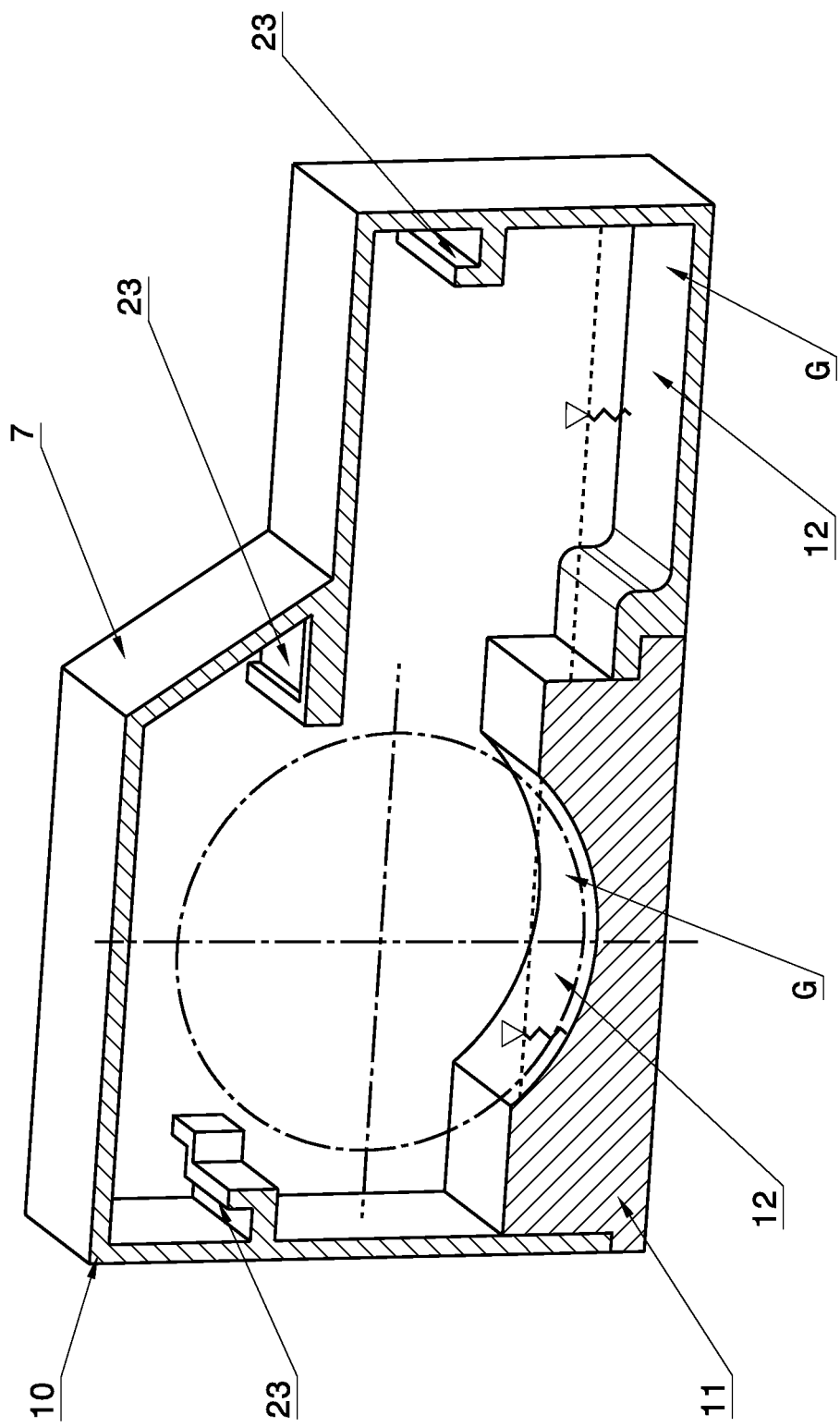
FIG. 6 shows a vertical section through the transmission housing of a further form of embodiment of the traction transmission.

FIG. 6 shows a section through a transmission housing 7 of a further form of embodiment of a traction transmission 1, wherein catching pockets 23 are arranged in one of the housing parts 10, 11 of the transmission housing 7, which catching pockets 23 are provided for purposes of catching and onward direction of the transmission oil G. The catching pockets 23 are preferably integrally manufactured with the transmission housing 7 and, like the transmission housing 7 itself, are accordingly suitably shaped such that the transmission oil G can be transported to the desired regions within the transmission housing 7. As an alternative to the integral manufacture of the catching pockets 23 with the transmission housing 7, the catching pockets 23 can also be joined, for example screwed, to the transmission housing 7. By a suitable design of separate oil sumps 12, a different level of transmission oil G can be achieved in the individual oil sumps 12. By this means, the amount of transmission oil G in circulation can be influenced in such a way as to ensure sufficient oil feed to the bearings and into the meshing of the gears of the transmission 1, while at the same time minimising splash losses.

Figure 7:
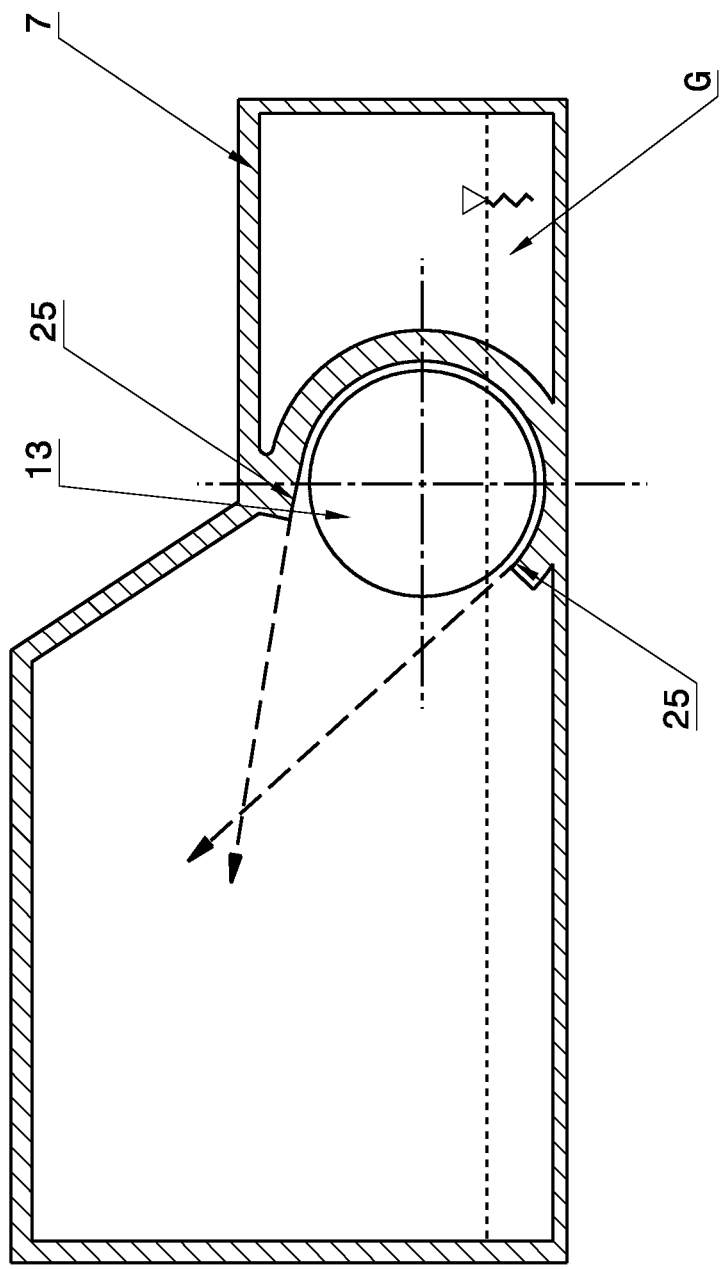
FIG. 7 shows a vertical section through a transmission housing of a further form of embodiment of a traction transmission.

FIG. 7 shows a further sectional view through the transmission housing 7, wherein throw-off surfaces 25 are arranged in the transmission housing 7 and are preferably manufactured integrally with the latter, by means of which surfaces the throw-off of the transmission oil G is supported during rotation of the feeder disc 13, and thus the transport of the transmission oil G to higher regions within the transmission housing 7 is supported. As an alternative to the integral manufacture of the throw-off surfaces 25 with the transmission housing 7, the throw-off surfaces 25 can also be joined, for example screwed, to the transmission housing 7.

Figure 8:
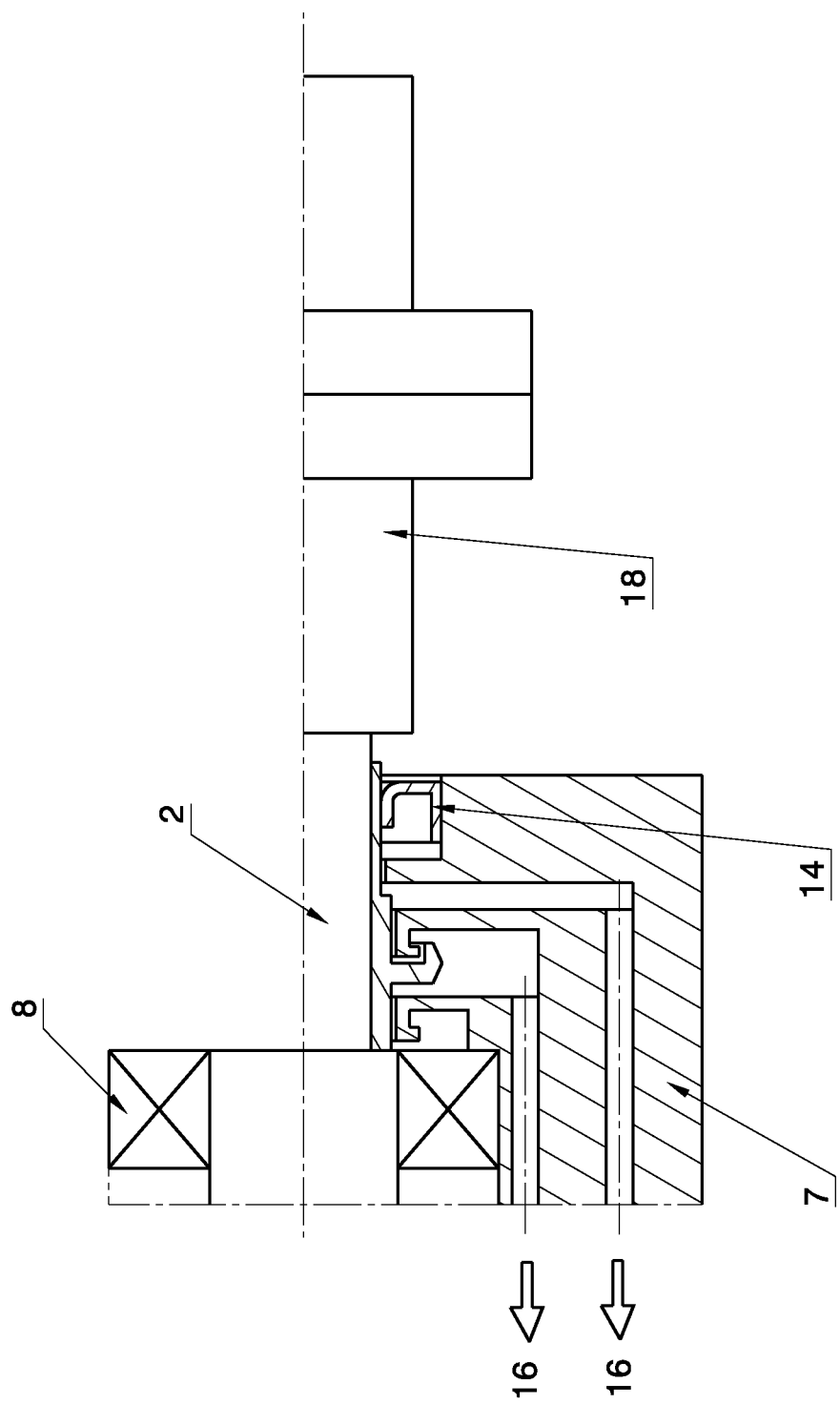
FIG. 8 shows a sectional view of a further form of embodiment of a traction transmission in the region of the input drive shaft.

Finally, FIG. 8 shows a detailed view through a form of embodiment of the traction transmission 1 in the region of the input drive shaft 2, wherein the labyrinth seal 14 for purposes of sealing the input drive shaft 2 with respect to the transmission housing 7 is shown. By way of suction lines 16 in the region of the input drive shaft 2, the transmission oil G is drawn off by way of the feeder disc 13. As already mentioned with respect to FIG. 3, the input drive shaft 2 is preferably connected to a drive motor (not shown) by means of a coupling 18, in particular a compensating coupling, for example a curved-tooth coupling. In addition to primary spring deflections, the coupling 18 also suitably compensates for the displacements that occur due to the compensation for the wear of a rail wheel.

The invention claimed is:

1. A traction transmission for purposes of transmitting the rotation of an input drive shaft to a rail wheel which is connected in a rotationally fixed manner to an output drive shaft, comprising:
    at least two transmission stages, in each case having at least one first gear or pinion, and at least one second gear larger than the first gear, and
    a transmission housing with bearings for the input drive shaft and the output drive shaft, and
    transmission oil arranged in the transmission housing,
    wherein the input drive shaft is sealed off from the transmission housing by a first labyrinth seal, and the output drive shaft is sealed off from the transmission housing by a second labyrinth seal, and in a position of use the input drive shaft is arranged below the output drive shaft, a separate oil sump is arranged below each second gear of each transmission stage, and a feeder disc, for purposes of feeding the transmission oil from the oil sump of the first transmission stage, is connected in a rotationally fixed manner to, or integrated with, the second gear, or an intermediate gear, of the first transmission stage, and at least one suction line is arranged in a feeder disc region of the feeder disc, which opens out in a labyrinth seal region of the first labyrinth seal of the input drive shaft, and
    wherein the transmission housing has an attachment element for purposes of a pivotable arrangement about an axis parallel to an axis of rotation of the input drive shaft and the output drive shaft.

2. The traction transmission according to claim 1, wherein the input drive shaft is arranged a vertical distance of between 50 mm and 200 mm below the output drive shaft.

3. The traction transmission according to claim 1, wherein, the transmission housing is formed by at least two housing parts.

4. The traction transmission according to claim 1, wherein the height of the transmission housing in an input drive shaft region of the input drive shaft is less than the height of the transmission housing in an output drive shaft region of the output drive shaft.

5. The traction transmission according to claim 1, wherein the height of the transmission housing in an input drive shaft region of the input drive shaft is 30% to 70% less than the height of the transmission housing in an output drive shaft region of the output drive shaft.

6. The traction transmission according to claim 1, further comprising contacting sealing elements, in addition to the first labyrinth seal of the input drive shaft, and/or the second labyrinth seal of the output drive shaft.

7. The traction transmission according to claim 1, wherein a coupling is arranged on the input drive shaft.

8. The traction transmission according to claim 7, wherein the coupling is a compensating coupling.

9. The traction transmission according to claim 8, wherein the compensating coupling is a curved tooth coupling.

10. The traction transmission according to claim 1, wherein at least one closable inlet and at least one closable outlet for the transmission oil are arranged on the transmission housing.

11. The traction transmission according to claim 1, wherein at least one sight glass for purposes of checking the level of the transmission oil, and at least one vent opening, are arranged on the transmission housing.

12. The traction transmission according to claim 1, wherein throw-off surfaces are arranged on the transmission housing for purposes of throwing the transmission oil off toward the output drive shaft.

13. The traction transmission according to claim 1, wherein catching pockets are provided on an inner face of the transmission housing for purposes of catching and onward direction of the transmission oil.

14. The traction transmission according to claim 1, wherein the input drive shaft is arranged a vertical distance of between 120 mm and 140 mm below the output drive shaft.

* * * * *